(12) United States Patent
Gehwolf et al.

(10) Patent No.: US 9,566,731 B2
(45) Date of Patent: Feb. 14, 2017

(54) FILTER ELEMENT, FILTER DEVICE AND METHOD FOR PRODUCING A FILTER ELEMENT

(71) Applicant: MANN+HUMMEL GMBH, Ludwigsburg (DE)

(72) Inventors: Klaus Gehwolf, Mamming (DE); Michael Maier, Reisbach (DE)

(73) Assignee: MANN+HUMMEL GMBH, Ludwigsburg (DE)

( * ) Notice: Subject to any disclaimer, the term of this patent is extended or adjusted under 35 U.S.C. 154(b) by 156 days.

(21) Appl. No.: 14/524,786

(22) Filed: Oct. 27, 2014

(65) Prior Publication Data
US 2015/0115500 A1 Apr. 30, 2015

Related U.S. Application Data

(60) Division of application No. 13/464,251, filed on May 4, 2012, now abandoned, which is a continuation of application No. PCT/EP2010/066880, filed on Nov. 5, 2010.

(51) Int. Cl.
| | |
|---|---|
| *B29C 45/14* | (2006.01) |
| *B01D 29/11* | (2006.01) |
| *B01D 46/24* | (2006.01) |
| *B01D 46/52* | (2006.01) |
| *B29C 65/70* | (2006.01) |
| *B29C 65/00* | (2006.01) |
| *B29L 31/14* | (2006.01) |

(52) U.S. Cl.
CPC ....... *B29C 45/14065* (2013.01); *B01D 29/111* (2013.01); *B01D 46/2411* (2013.01); *B01D 46/521* (2013.01); *B29C 45/14336* (2013.01); *B29C 65/70* (2013.01); *B29C 66/133* (2013.01); *B29C 66/4322* (2013.01); *B29C 66/5344* (2013.01); *B29C 66/5432* (2013.01); *B01D 2265/04* (2013.01); *B29L 2031/14* (2013.01); *Y10T 29/4998* (2015.01)

(58) Field of Classification Search
CPC .................. B29C 45/14065; B29C 45/14336; B29C 66/5344; B29C 66/5432; B29C 66/133; B29C 65/70; B29C 66/4322; B01D 46/521; B01D 46/2411; B01D 29/111; B01D 2265/04; B01D 35/30; B01D 35/308; B01D 46/0002; B01D 2210/30; B01D 46/0016; Y10T 29/4998; B29L 2031/14
USPC ....... 210/493.2, 483, 435, 450; 55/498, 490, 55/495; 29/527.1; 264/478
See application file for complete search history.

(56) References Cited

U.S. PATENT DOCUMENTS 4,735,720 A * 4/1988 Kersting ............... B01D 29/111
210/493.5

* cited by examiner

*Primary Examiner* — Madeline Gonzalez
(74) *Attorney, Agent, or Firm* — James Hasselbeck

(57) ABSTRACT

Filter element (1) has opposing end sections (3A, 3B) of a filter material sheet (2) that are connected to each other in a fluid-tight manner, wherein a molded or extruded plastic casing (5) encloses the end edges (4A, 4B) of the end sections (3A, 3B). A method for producing a corresponding filter element (1) includes the encasing of opposing end edges (4A, 4B) of end sections (3A, 3B) of a filter material sheet (2) with a plastic casing (5) so as to form a continuous bellows.

4 Claims, 4 Drawing Sheets

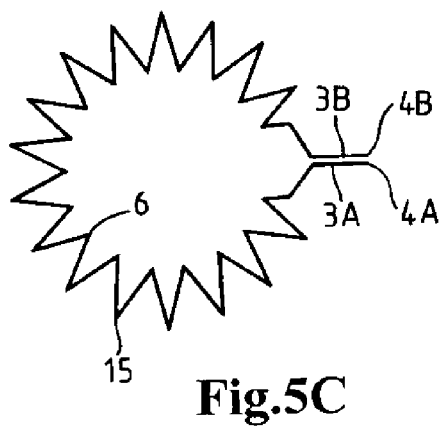
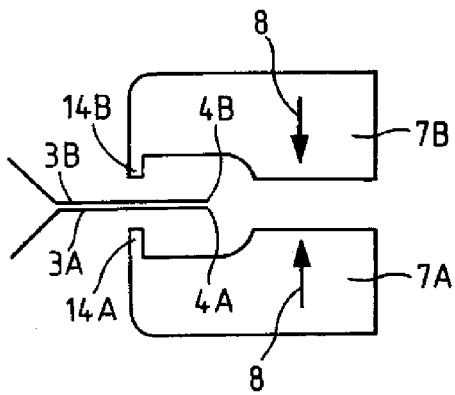
Fig.5C
Fig.5D
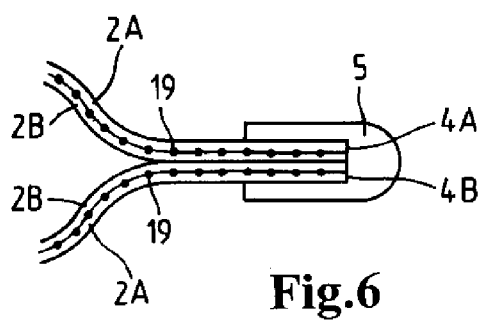
Fig.6
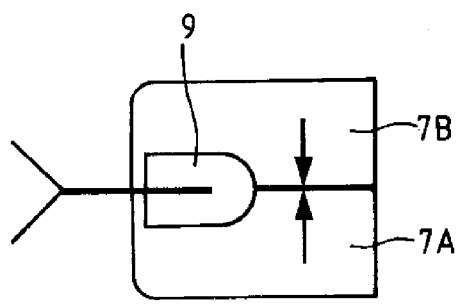
Fig.5E
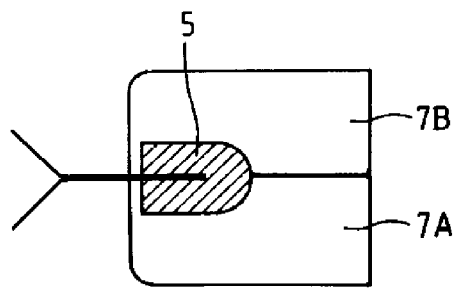
Fig.5F

FILTER ELEMENT, FILTER DEVICE AND METHOD FOR PRODUCING A FILTER ELEMENT

CROSS-REFERENCE TO RELATED APPLICATIONS

This application is a Divisional of application Ser. No. 13/464,251 filed May 4, 2012 which is a bypass continuation of International Application No. PCT/EP2010/066880, filed Nov. 5, 2010 which claims priority to German Application No. 10 2009 052 123.2, filed Nov. 5, 2009.

TECHNICAL FIELD

This disclosure relates generally to a filter element, in particular with multi-layer filter media, for example, nonwoven filter materials. Moreover, a filter device and a method for producing filter elements are also disclosed.

BACKGROUND OF THE INVENTION

In order to filter, for example, in the automotive field, fluids such as fuels, operating media or passenger compartment air, often folded or pleated nonwoven filter materials are used. In this connection, it is often required to connect various edges or end sections of these flat filter materials with each other. Known filter elements are produced, for example, from initially zigzag-folded filter material sheets that are formed to a tubular body. In order to close the tubular body, the terminal fold sections must be connected with each other in a fluid-tight way.

In the past, for example, metal clips or clamps were used in order to hold the two flat sections resting on each other together. It is also conventional to adhesively connect the two filter material sheets with each other or to connect them by fusing. In particular in case of multi-layer filter media, for example, several layers of thin nonwoven material that is impregnated or comprises special intermediate layers, it is difficult to prevent fraying of the edges that are resting on each other. A particular difficultly resides in connecting the flat media to be connected fluid-tightly to each other, i.e., the fluid to be filtered may not pass unfiltered the filter material at the connecting location.

SUMMARY OF THE INVENTION

The present invention has the object to provide an improved filter element, in particular with connected terminal fold sections of filter bellows media.

Accordingly, the filter element has opposed end sections of a filter material sheet that are connected fluid-tightly with each other wherein a molded and/or extruded plastic casing encloses the terminal edges of the end sections.

The molded and/or extruded plastic casing seals in this connection the end sections or terminal edges that are connected to each other. Preferably, the plastic casing encloses the terminal edges across their entire length. In this way, a fluid-tight connection between terminal fold sections resting on each other is achieved when the filter material is folded in a zigzag shape in order to form an endless fold bellows.

In a variant of the filter element the plastic casing is applied by means of an injection molding process about and/or on the terminal edges.

In a variant of the filter element the plastic casing is applied by means of an extrusion method about and/or on the terminal edges.

While usually extruded hot melts are used that are applied only to the inner sides, i.e., between the end sections that are resting flat on each other, the proposed plastic casing encloses the sections to be connected to each other completely.

As filter material in particular nonwoven filter materials and/or filter paper are conceivable. As a starting material in general sheets of an appropriate nonwoven filter material or filter paper or a combination thereof are cut, folded and subsequently the end sections are connected to each other. In this way, an endless fold bellows results that is processed further.

A filter element has accordingly a flat filter material with at least two end sections wherein the two end sections are secured to each other and no open terminal edges exist because the molded and/or extruded plastic casing encloses both terminal edges of the end sections.

In this connection, the filter material can have several layers wherein, for example, between the layers an absorbent material such as active carbon particles can be filled in. For example, filter media are employed that between two layers have active carbon particles that absorb dirt or odor. In particular in case of multi-layer filter media one achieves by the plastic casing that the layers will not fray or particles introduced between the layers will not fall out of the filter element.

Moreover, a filter device is proposed that has a corresponding filter element and is embodied as an operating medium filter, for example, a fuel filter, oil filter, or an air or passenger compartment filter for a motor vehicle.

In the filter device the filter element can be provided in particular between an upper and a lower cover. These are referred to also as filter end disks between which a zigzag-folded filter bellows is provided.

In particular, the plastic casing can be of the same material as the upper and the lower covers or the employed end disks. Since the end disks must be resistant relative to the media to be filtered, for example, gasoline or lubricants, the same material lends itself in regard to selecting the plastic casing. In this way, it is not necessary to select other, for example, matching adhesives that may also make disposal of a soiled filter more difficult.

Moreover, a method for producing a filter element is proposed. In this connection, enclosing by molding of opposed terminal edges of end sections of a filter material sheet with a plastic casing for forming an endless bellows or a connection of opposed terminal edges by an extrusion process is carried out.

For example, as a plastic material a thermoplastic material is melted and injected by an injection molding process into a mold defining the shape of the casing. Optionally, the method comprises that the end sections are resting flat on each other. Moreover, the filter material sheet can be folded multiple times in a zigzag shape parallel to the terminal edges.

Preferably, the terminal edges are enclosed completely by molding across their entire length. Prior to molding, the end sections are pressed against each other. Moreover, pressing against each other can also be realized during molding.

In a variant of the method, pressing against each other is done by an injection molding tool. Pressing edges can be integrated into the injection molding tool that, on the one hand, secure the filter material surfaces resting on each other and, on the other hand, form a cavity for the plastic material to be injected. These pressing edges can be adjusted at any spacing relative to the terminal edges of the end sections so that the area of the end sections and terminal edges that are to be enclosed by the plastic material can be easily adjusted.

Further possible implementations of the invention comprise also not explicitly mentioned combinations of features, method steps or embodied variants described above or in the following with regard to embodiments. In this connection, a person of skill in the art will add individual aspects as improvements or supplements to the respective basic form of the invention.

The above features and advantages and other features and advantages of the present invention are readily apparent from the following detailed description of the best modes for carrying out the invention when taken in connection with the accompanying drawings.

BRIEF DESCRIPTION OF THE DRAWINGS

The accompanying Figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Features of the present invention, which are believed to be novel, are set forth in the drawings and more particularly in the appended claims. The invention, together with the further objects and advantages thereof, may be best understood with reference to the following description, taken in conjunction with the accompanying drawings. The drawings show a form of the invention that is presently preferred; however, the invention is not limited to the precise arrangement shown in the drawings.

FIGS. 5A-5F present illustrations for explaining variants of a manufacturing process for filter elements, in particular:

FIG. 5A depicts a flat filter material sheet for the disclosed method of producing a filter element;

FIG. 5B depicts the filter material sheet first pleated or folded, according to the disclosed method of producing a filter element;

FIG. 5C shows a cross-sectional illustration of the zigzag-shaped filter material sheet is bent such that the two end sections rest flat on each other;

FIG. 5D shows schematically in cross-section a two-part injection molding tool;

FIG. 5E shows schematically in cross-section the two-part injection molding tool clamping by pressing edges the filter material sheet end sections onto or against each other; and FIG. 5F shows how the solidified plastic material after injection molding is still within the injection mold;

FIG. 6 is a cross-sectional illustration of an alternative embodiment of a filter element;

In the Figures, same or functionally the same elements, if nothing to the contrary is mentioned, are provided with the same reference characters.

Figure 1:
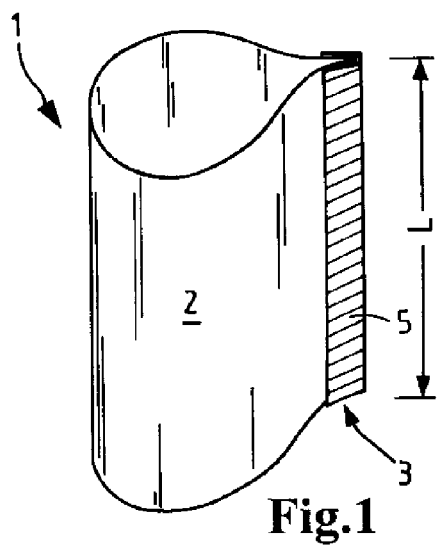
FIG. 1 is a perspective illustration of a first embodiment of a filter element.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of apparatus components related to filter element and device and methods for producing the filter element. Accordingly, the apparatus components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

FIG. 1 shows a first embodiment of a filter element. In this connection, the filter element 1 is formed of a sheet of a flat filter medium, for example, a nonwoven filter material. First, rectangular nonwoven filter material sheets are formed such that end sections of the sheet 3 rest against each other. In FIG. 1 this results in an endless filter bellows 2 wherein the end sections 3 are secured by a plastic casing 5 which, for example, has been molded by an injection molding process about the terminal folds or terminal edges. The plastic casing 5 is indicated in cross-hatching. The filter element 1 can be inserted, for example, in a filter device into a filter cup so that the fluid to be filtered, for example, fuel, oil but also air, can pass through the filter medium and is purified thereby.

In this connection, the molded plastic casing 5 encloses fluid-tightly the respective two end sections connected to each other across the entire length L or, in the illustration of FIG. 1, across the entire height.

Figure 2:
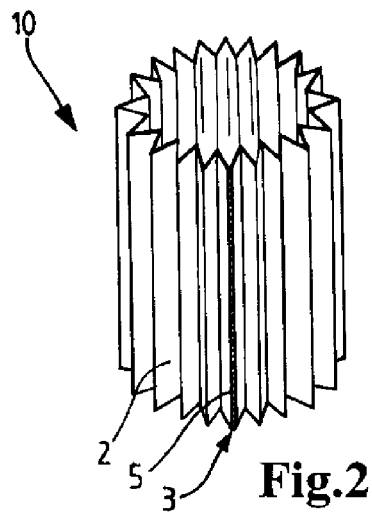
FIG. 2 is a perspective illustration of a second embodiment of the filter element.

FIG. 2 shows a perspective illustration of a second embodiment wherein a filter element 10 is formed of a zigzag-folded nonwoven filter material. This zigzag-folded filter material is formed to a bellows 2 in that end sections or terminal fold sections 3 are connected to each other by the molded plastic material as a casing 5. Because of the zigzag folding a larger surface area of the filter material in the filter element 10 is provided. The connection of the end sections 3 of the flat filter material is explained in the following Figures in more detail.

Figure 3:
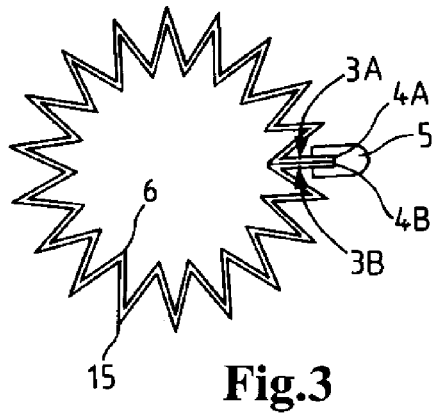
FIG. 3 is of cross-sectional illustration of the second embodiment of a filter element.

In FIG. 3, a cross-section of the embodiment illustrated in FIG. 2 of a filter element is shown. In an illustration of FIG. 3 one is looking onto the fold profile in the orientation of FIG. 2 from above or downward onto the fold bellows. Accordingly, folds 6 and 15 with opposite orientation result. The two terminal fold sections 3A, 3B are connected to each other and sealed relative to each other by the plastic casing 5 that is produced by a plastic injection molding method. In this context, the plastic casing 5 encloses completely the terminal edges 4A, 4B of the terminal fold sections 3A, 3B. From the interior of the fold bellows no fluid can escape through the end sections 3A, 3B that are connected to each other.

Figure 4:
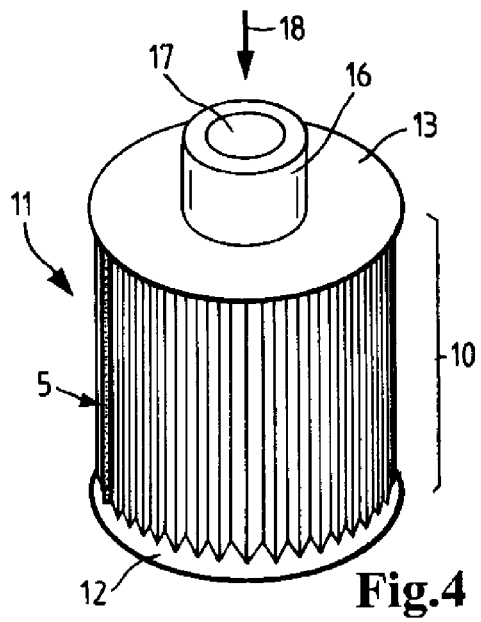
FIG. 4 is a schematic illustration of an embodiment of a filter device.

FIG. 4 shows a filter device 11, for example, as a fuel filter, that is embodied with an afore described filter element 10. The filter device or the fuel filter 13 comprises a fold bellows 2 formed of a zigzag-folded filter material and secured between two covers 12, 13. The fold bellows corresponds to a filter element 10 where two end sections are fluid-tightly connected to each other by the molded plastic casing 5.

The upper cover 13 is provided with a connector 16 that has an opening 17. The fluid to be filtered can flow, for example, in the direction of arrow 18 into the interior of the fold bellows 10 and flow out through the folds of the filter material. Of course, further filter devices are conceivable. For example, the filter element can be inserted into a filter cup or can be embodied as an angular bellows. The covers 12, 13 are also referred to as end disks.

Figure 5A:
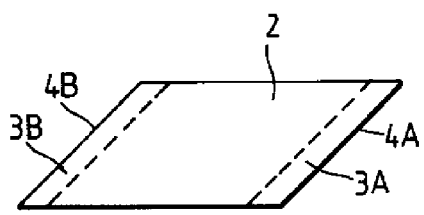
Figure 5B:
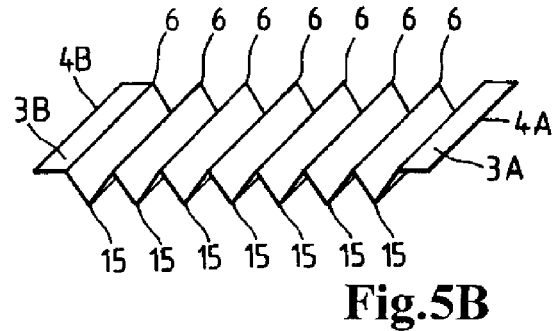

The illustrations in FIGS. 5A-5F serve for explaining the variants of the manufacturing process for corresponding filter elements. In a first step, as illustrated in FIG. 5A, a flat filter material sheet 2 is provided. The filter material sheet 2 is of a rectangular shape, for example. The opposed end sections 3A, 3B are thus to be connected to each other so that a tubular filter element body is formed. In particular, the terminal edges 4A, 4B are thus placed against each other. In order to form a zigzag-folded bellows, as illustrated in FIGS. 2 and 3, the filter material sheet is first pleated or folded. This is illustrated in FIG. 5B. There are different methods known for folding filter materials in a zigzag shape. For example, oppositely engaging folding blades can be used that produce folds in different orientation 6,15 in the filter sheets. Also, rotating blade arrangements are known.

In FIG. 5B, a folded filter material sheet is illustrated wherein the end sections 3A, 3B now correspond to the terminal fold sections 3A, 3B.

FIG. 5C shows a cross-sectional illustration, similar to FIG. 3. The zigzag-shaped filter material sheet is bent such that the two end sections 3A, 3B rest flat on each other. In this connection, the terminal edges 4A, 4B form a common terminal edge.

In a subsequent step, the terminal fold sections 3A, 3B are pressed against each other. This can be done, for example, by suitable pressing edges 14A, 14B. FIG. 5D shows schematically in cross-section a two-part injection molding tool 7A, 7B. The injection molding tool, for example, can press like a clamp by means of the pressing edges 14A, 14B the two end sections 3A, 3B onto or against each other. By moving toward each other in the direction of arrow 8, by means of the injection tool 7A, 7B a cavity is formed about the terminal fold edges 4A, 4B. This is illustrated in more detail in FIG. 5E. The two injection molding tool parts 7A, 7B enclose in this connection a cavity 9. Into this cavity, the liquid plastic material is now introduced under pressure.

FIG. 5F shows how the solidified plastic material after injection molding is still within the injection mold 7A, 7B. The solidified plastic material forms thus a plastic casing 5, indicated in FIG. 5F by crosshatching. The spacing of the pressing edges 14A, 14B from the terminal edges 4A, 4B of the end sections 3A, 3B can be matched as desired to the respective conditions. If the endless bellows seam connection along the edges 4A, 4B is to be especially robust, it is possible to enlarge the spacing or the surface that is enclosed by the plastic material.

By the proposed manufacturing process across the entire length of the edges a reliable fluid-tight sealing action is achieved. In particular by enclosing the edges, fraying of the filter material will be prevented.

FIG. 6 shows a section illustration of an alternative embodiment for end sections or terminal edges of a filter material sheet that are to be connected to each other. Here, multi-layer filter media are illustrated. FIG. 6 shows only the end sections with terminal edges enclosed by the casing 5 in cross-section.

In this connection, the filter material sheet that is formed to an endless bellows has two layers 2A, 2B of a nonwoven filter material. Between the layers 2A, 2B, for example, active carbon particles 19 are strewn that serve as an absorber. The casing 5 is formed of molded plastic material.

FIG. 6 also shows that the terminal edges 4A, 4B of the filter material sheet 2A, 2B are enclosed by the casing 5. This means in particular that the activated carbon particles 19 cannot fall out.

Figure 7:
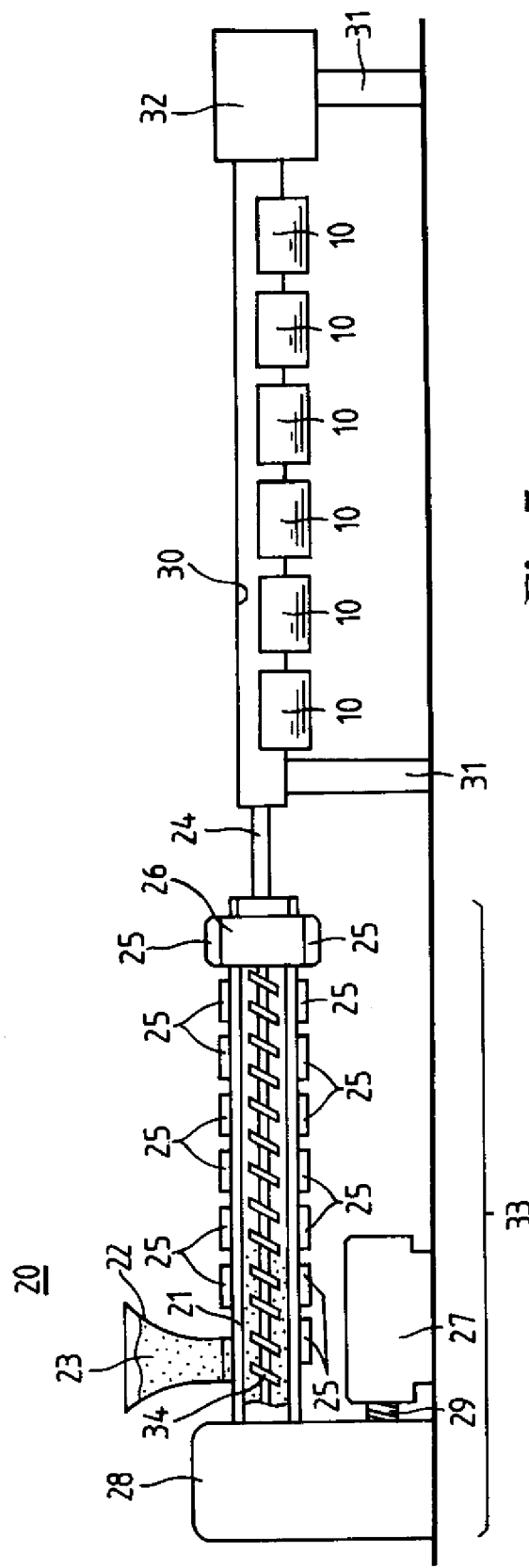
FIG. 7 is a section illustration of an embodiment of a manufacturing arrangement for filter elements.
Figure 8:
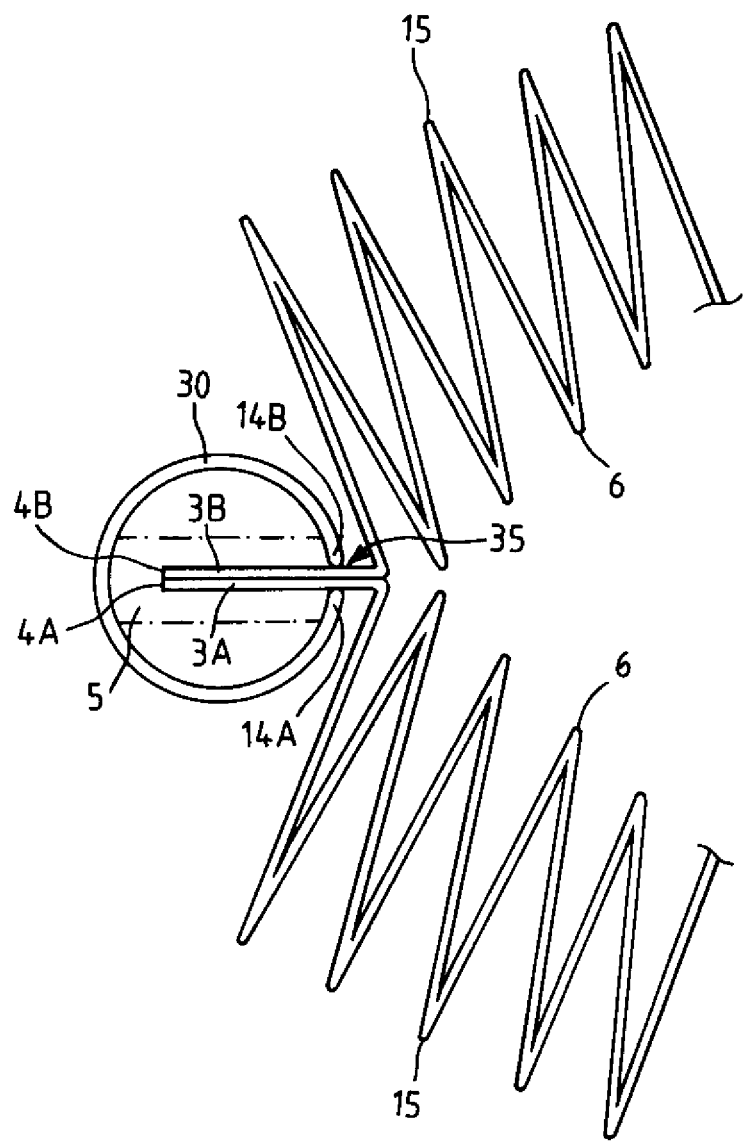
FIG. 8 is a section illustration of an embodiment of an extrusion tube for use in the manufacturing arrangement.

FIGS. 7 and 8 show an arrangement for performing an alternative variant of the manufacturing process for a filter element. The manufacturing arrangement 20, as illustrated in FIG. 7, has an extruder device 33 that serves for providing liquid plastic material. For this purpose, a cylinder 21 is provided with heating elements 25 wherein in the interior of the extruder cylinder or extruder tube 21 an advancing worm 34 is provided. The advancing worm 34 serves for conveying granular plastic material 23, filled in by means of a hopper 22 into the interior of the cylinder 21, to the right in the orientation of FIGS. 7 to 8. At the same time, melting of the granular plastic material or of the plastic granulates by heating elements 25 is realized.

The drive action of the conveying worm 34 is realized by means of a motor 27 that is coupled by a shaft 29 to a reduction gearbox 28. At one end of the cylinder 21 a tool 26 is coupled that is also heated. By conveying and heating the plastic granulates 23, liquid plastic material is ready in the tool 26 for enclosing the end sections resting against each other.

In order to secure the end sections, for example in the way as illustrated in FIG. 5 with a pressing edge, in the arrangement of FIG. 7 a slitted tube 30 is used. The longitudinally slitted tube 30 serves for holding the terminal edges or end sections of the filter material together and, at the same time, they serve as a mold or tool for the plastic casing.

In FIG. 8, the tube 30 is illustrated in cross-section. The tube 30 has a slot in which the terminal fold sections 3A and 3B of the filter material are clamped. Because of the tubular shape the two tubular sections 14A, 14B are pressing like a clamp the two filter material layers 3A, 3B onto each other. Within the tube, moreover, as indicated by the dash-dotted lines, a profile can be formed.

The zigzag-folded or pleated filter material can be inserted into the tube slit 35 (compare FIG. 7). Subsequently, into the interior of the tube 30 the liquid plastic material is introduced. After cooling, a plastic casing 5 results about the terminal edges 4A, 4B and parts of the terminal sections 3A, 3B.

In this connection, several filter elements 10 are clamped in the tubular slit 35 or are provided with the plastic casing 5. The several filter elements 10, in the orientation of FIG. 7 to the right, can be separated from each other by a cutting device 32. In FIG. 7, the extrusion tube 30 and the cutting device 32 are supported on supports 31.

The slitted tube can be provided at the inner side with a coating in order to reduce adhesion of the liquid plastic material. Moreover, the inner side of the tube can be provided with any type of a profile in order to realize, for example, desired geometries for the casing.

The proposed measures for closing off the end sections or manufacturing processes of filter elements and filter devices provide a particular seal-tightness of this bellows seam connection or the connection of the end sections. Moreover, an improved visual appearance is provided because no further auxiliary means such as clamps or adhesive are used. Moreover, in particular in the manufacture of a filter, generally no additional further material is required therein so that processing can be realized particularly cost-efficiently. By employing a plastic material as a casing that is used, for example, in the covers or end disks of the filter device, disposal of the corresponding filters is also possible in a particularly simple and inexpensive way.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of the present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

The invention claimed is:

1. A method for producing a filter element comprising:
   providing an injection molding tool having a cavity for molding a plastic casing;
   providing a sheet of filter material having end sections at opposing ends of the sheet, said opposing end sections each having a terminal edge, said terminal edges have an overall length (L);
   forming said sheet into a circumferentially closed endless bellows;
   arranging said terminal edges in said cavity such that said opposing end sections are overlaid;
   overlaying said end sections of said filter material sheet onto each other;
   pressing said opposing end sections together by clamping with the injection molding tool, wherein pressing edges of the molding tool securely clamps said opposing end sections together to remain in an overlaid onto and against each other position over said overall length;
   further securing said clamped end sections together to remain in the overlaid onto and against each other position, by the steps of:
      injecting a plastic material under pressure into said cavity onto the overlaid and clamped opposing end sections by injection molding;
      solidifying the plastic material on the overlaid opposing end sections forming a molded or extruded elongated plastic casing formed directly on and covering at least a portion of said length of said securely clamped terminal edges;
   wherein said plastic casing is formed directly on said terminal edges and is not a clamp installed onto the end sections, said directly formed plastic casing solidified on said terminal edges securing said terminal edges together without an adhesive or clamp, thereby avoiding fraying of terminal edges and providing a seal-tight connection of the opposing end sections without clamp or adhesive;
   wherein said end sections are connected fluid-tightly with each other by said plastic casing.

2. The method of claim 1, wherein
   in said arranging step, said end sections are placed flat against each other.

3. The method of claim 1, wherein before said forming step said method further comprises:
   folding said sheet into a plurality of zig-zag folds, said folds aligned parallel to each other and parallel to said terminal edges;
   wherein in said forming step, said circumferentially closed endless bellows is a circumferentially closed endless folded bellows.

4. The method of claim 1, wherein
   in said applying step, said terminal edges are completely enclosed and embedded within said plastic casing along the entire overall length (L).

* * * * *